(12) United States Patent
Aoki

(10) Patent No.: US 10,747,654 B2
(45) Date of Patent: Aug. 18, 2020

(54) SOFTWARE QUALITY DETERMINATION APPARATUS, SOFTWARE QUALITY DETERMINATION METHOD, AND SOFTWARE QUALITY DETERMINATION PROGRAM

(71) Applicant: TOYOTA JIDOSHA KABUSHIKI KAISHA, Toyota-shi (JP)

(72) Inventor: Eisuke Aoki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 11 days.

(21) Appl. No.: 16/153,928

(22) Filed: Oct. 8, 2018

(65) Prior Publication Data
US 2019/0163617 A1  May 30, 2019

(30) Foreign Application Priority Data
Nov. 29, 2017  (JP) ................................. 2017-229604

(51) Int. Cl.
*G06F 9/44* (2018.01)
*G06F 11/36* (2006.01)

(52) U.S. Cl.
CPC ...... *G06F 11/3688* (2013.01); *G06F 11/3676* (2013.01)

(58) Field of Classification Search
None
See application file for complete search history.

(56) References Cited

U.S. PATENT DOCUMENTS 8,032,863 B2 * 10/2011 Kolawa ............... G06F 11/3616
717/124
9,244,810 B2 * 1/2016 Alfieri .................. G06F 11/362
(Continued)

FOREIGN PATENT DOCUMENTS

CN    105095086 A  * 11/2015
CN    106528433 A  *  3/2017
(Continued)

OTHER PUBLICATIONS

Killian et al., Finding Latent Performance Bugs in Systems Implementations, ACM Copyright 2010 (Year: 2010).*
(Continued)

*Primary Examiner* — Insun Kang
(74) *Attorney, Agent, or Firm* — Oblon, McClelland, Maier & Neustadt, L.L.P.

(57) ABSTRACT

A software quality determination apparatus includes a bug convergence determination unit and a display unit. The bug convergence determination unit determines, for each component and for each test viewpoint, the convergence of the bug generated in the test of the component and the test viewpoint after a test execution amount of the component and the test viewpoint has reached an execution reference amount, which serves as a reference of the execution amount of the component and the test viewpoint. The display unit displays, for the each component and the each test viewpoint, the result of the determination of the convergence of the bug generated in the test of the component and the test viewpoint. The execution amount and the execution reference amount for the each component and the each test viewpoint are weighted in accordance with an index value that indicates a scale of the component.

4 Claims, 24 Drawing Sheets

(56) References Cited

U.S. PATENT DOCUMENTS

| | | | |
|---|---|---|---|
| 2005/0114829 A1* | 5/2005 | Robin | G06Q 10/06 |
| | | | 717/101 |
| 2006/0123389 A1* | 6/2006 | Kolawa | G06F 11/3616 |
| | | | 717/101 |
| 2009/0265681 A1 | 10/2009 | Beto | |
| 2010/0030626 A1* | 2/2010 | Hughes | G06Q 30/02 |
| | | | 717/128 |
| 2013/0031423 A1* | 1/2013 | Barrow | G06F 8/77 |
| | | | 714/47.2 |
| 2014/0033174 A1 | 1/2014 | Farchi et al. | |
| 2014/0173561 A1* | 6/2014 | Toub | G06F 8/73 |
| | | | 717/123 |
| 2015/0169380 A1* | 6/2015 | Inoue | G06F 9/5088 |
| | | | 718/105 |
| 2015/0317235 A1 | 11/2015 | Lachambre | |
| 2016/0321586 A1 | 11/2016 | Herzig | |
| 2016/0364319 A1* | 12/2016 | Che | G06F 11/3664 |
| 2018/0276103 A1* | 9/2018 | Woulfe | G06F 11/3608 |
| 2019/0026216 A1* | 1/2019 | Mankovskii | H04L 67/10 |
| 2019/0079854 A1 | 3/2019 | Lassance Oliveira E Silva | |
| 2019/0156249 A1* | 5/2019 | Nakata | G06N 3/0454 |

FOREIGN PATENT DOCUMENTS

| | | | | |
|---|---|---|---|---|
| JP | 2008033662 A | * | 2/2008 | |
| JP | 2010113527 A | * | 5/2010 | |
| JP | 4646248 | | 3/2011 | |
| JP | 2014-174895 | | 9/2014 | |
| JP | 2014174895 A | * | 9/2014 | |
| JP | 2014203095 A | * | 10/2014 | |
| JP | 2018-026056 | | 2/2018 | |

OTHER PUBLICATIONS

Software Reliability Enhancement Center, Technology Headquarters, Information-technology Promotion Agency, independent administrative agency, "White Papers on Software Development Data, 2016-2017", 2016, 3 pages.

Yamazaki, T. "Defect removal by ODC analysis and visualization of quality maturity", Olympus Software Technology Corp., Embedded Technology West 2014 IPA seminar, 2014, 2 pages.

"Revised Edition, Embedded Software Development Quality Reference Guide," Software Engineering Center, Technology Headquarters, Information-Technology Promotion Agency, Independent Administrative Agency, 2012, 3 Pages.

"White Papers on Software Development Data, 2016-2017," Software Reliability Enhancement Center, Technology Headquarters, Information-technology Promotion Agency, independent administrative agency, Oct. 2016, 3 Pages.

Fenton N. et al., "Software Metrics: Roadmap", Proceedings of the Conference on the Future of Software Engineering, ICSE '00, ACM Press, New York, USA, May 1, 2000, pp. 357-370, XP058374916, DOI:10.1145/336512.336588; ISBN: 978-1-58113-253-3.

Office Action dated Mar. 31 2020 in the related U.S. Appl. No. 16/156,083.

Khun et al; Software fault interactions and implications for software testing, 4 pages. (Year:2004).

* cited by examiner

| COMPONENT |
|---|
| IMAGE PROCESSING |
| EXTERNAL IF CONTROL |
| INTERNAL IF CONTROL |
| GUI CONTROL |
| INPUT/OUTPUT |
| FILE MANAGEMENT |
| GUI MANAGEMENT |
| DATA CONVERSION |
| OTHERS |

Fig. 2

| | TEST VIEWPOINT | | | | | |
|---|---|---|---|---|---|---|
| | FUNCTIONALITY | EFFICIENCY | RELIABILITY | USABILITY | MAINTAINABILITY | PORTABILITY |
| AVERAGE TEST EXECUTION REFERENCE AMOUNT (NUMBER OF TEST MAN-HOURS/KLOC) | A | 0.1A | 0.4A | 0.6A | 1.1A | 0.2A |

Fig. 4

| | TEST VIEWPOINT | | | | | |
|---|---|---|---|---|---|---|
| | FUNCTIONALITY | EFFICIENCY | RELIABILITY | USABILITY | MAINTAINABILITY | PORTABILITY |
| COMBINED TEST AVERAGE EXECUTION REFERENCE AMOUNT (NUMBER OF TESTS/KLOC) | A | 0.7A | 0.5A | 0.5A | 0.5A | 0.1A |
| SYSTEM TEST EXECUTION REFERENCE AMOUNT (NUMBER OF TESTS/KLOC) | a | 0.8a | 0.3a | 0.3a | 0.1a | 0.1a |

Fig. 5

| TEST PROCESS | TEST VIEWPOINT |
|---|---|
| COMBINED TEST | BASICS |
| | COMBINATION |
| | ORDER·REPEAT |
| | INTERACTIONS |
| SYSTEM TEST | LOAD·STRESS |
| | RECOVERY·EXCEPTIONS |
| | START·RE-START |
| | CONFIGURATION |
| | SCENARIO |

Fig. 6

| | BASICS | COMBINATION | ORDER · REPEAT | INTERACTIONS | LOAD-STRESS | RECOVERY-EXCEPTIONS | CONFIGURATION | SCENARIO |
|---|---|---|---|---|---|---|---|---|
| COMPONENT A | ○ | ○ | — | — | ○ | — | ○ | — |
| COMPONENT B | ○ | — | ○ | ○ | — | — | — | — |
| COMPONENT C | ○ | — | — | ○ | — | — | — | — |

Fig. 11

| | BASICS | COMBINATION | ORDER-REPEAT | INTERACTIONS | LOAD-STRESS | RECOVERY-EXCEPTIONS | CONFIGURATION | SCENARIO |
|---|---|---|---|---|---|---|---|---|
| COMPONENT A | LOW | LOW | — | — | HIGH | — | UNKNOWN | — |
| COMPONENT B | LOW | — | LOW | LOW | — | — | — | — |
| COMPONENT C | UNKNOWN | — | — | HIGH | — | — | — | — |

Fig. 14

| | BASICS | COMBINATION | ORDER-REPEAT | INTERACTIONS | LOAD-STRESS | RECOVERY-EXCEPTIONS | CONFIGURATION | SCENARIO |
|---|---|---|---|---|---|---|---|---|
| COMPONENT P | ○ | ○ | — | — | ○ | — | ○ | — |
| COMPONENT Q | ○ | — | ○ | ○ | — | — | — | — |
| COMPONENT R | ○ | — | — | ○ | ○ | — | — | — |
| COMPONENT S | ○ | ○ | — | — | — | — | ○ | — |
| COMPONENT T | ○ | — | ○ | ○ | — | — | — | — |
| COMPONENT U | ○ | — | — | ○ | ○ | — | — | — |

Fig. 21

SOFTWARE QUALITY DETERMINATION APPARATUS, SOFTWARE QUALITY DETERMINATION METHOD, AND SOFTWARE QUALITY DETERMINATION PROGRAM

CROSS REFERENCE TO RELATED APPLICATIONS

This application is based upon and claims the benefit of priority from Japanese patent application No. 2017-229604, filed on Nov. 29, 2017, the disclosure of which is incorporated herein in its entirety by reference.

BACKGROUND

The present disclosure relates to a software quality determination apparatus, a software quality determination method, and a software quality determination program.

In recent years, techniques for determining convergence of a bug generated in a system have been proposed.

For example, Japanese Unexamined Patent Application Publication No. 2014-174895 discloses a technique of predicting the number of bugs that will be generated in the feature in a system based on previous bug occurrence result data and predicting a convergence timing in which the bug will converge based on the number of bugs that has been predicted and a quality index indicating the quality required for the system.

SUMMARY

Incidentally, components that constitute a system have scales different from one another. Therefore, if the bug convergence is determined for each component and the results of the determination are displayed side by side, there is a problem that it is difficult for a user, who sees the results of the determination, to compare the results of the determination since the scale varies for each component.

The present disclosure has been made in view of the aforementioned circumstances and provides a software quality determination apparatus, a software quality determination method, and a software quality determination program capable of displaying the results of the bug convergence determination for each component in such a way that these results can be easily compared with one another.

A software quality determination apparatus according to one aspect of the present disclosure is a software quality determination apparatus configured to determine convergence of a bug generated in a system, the apparatus including:

a bug convergence determination unit configured to determine, for each component that constitutes the system and for each test viewpoint, which is a viewpoint when the system is tested, the convergence of the bug generated in a test of the component and the test viewpoint;

a display unit configured to display, for the each component and the each test viewpoint, the result of the determination of the convergence of the bug generated in the test of the component and the test viewpoint, in which the bug convergence determination unit determines, for the each component and the each test viewpoint, the convergence of the bug generated in the test of the component and the test viewpoint after a test execution amount of the component and the test viewpoint has reached an execution reference amount, which serves as a reference of the execution amount of the component and the test viewpoint, and the execution amount and the execution reference amount for the each component and the each test viewpoint are weighted in accordance with an index value that indicates a scale of the component.

A software quality determination method according to one aspect of the present disclosure is a software quality determination method by a software quality determination apparatus configured to determine convergence of a bug generated in a system, the method including:

a determination step for determining, for each component that constitutes the system and for each test viewpoint, which is a viewpoint when the system is tested, convergence of a bug generated in a test of the component and the test viewpoint; and a display step for displaying, for the each component and the each test viewpoint, the result of the determination of the convergence of the bug generated in the test of the component and the test viewpoint, in which in the determination step, for the each component and the each test viewpoint, the convergence of the bug generated in the test of the component and the test viewpoint is determined after a test execution amount of the component and the test viewpoint has reached an execution reference amount, which serves as a reference of the execution amount of the component and the test viewpoint, and the execution amount and the execution reference amount for the each component and the each test viewpoint are weighted in accordance with an index value that indicates a scale of the component.

A software quality determination program according to one aspect of the present disclosure is a software quality determination program for causing a computer that determines convergence of a bug generated in a system to execute the following procedures of:

a determination procedure for determining, for each component that constitutes the system and for each test viewpoint, which is a viewpoint when the system is tested, convergence of a bug generated in a test of the component and the test viewpoint; and a display procedure for displaying, for the each component and the each test viewpoint, the result of the determination of the convergence of the bug generated in the test of the component and the test viewpoint, in which in the determination procedure, for the each component and the each test viewpoint, the convergence of the bug generated in the test of the component and the test viewpoint is determined after a test execution amount of the component and the test viewpoint has reached an execution reference amount, which serves as a reference of the execution amount of the component and the test viewpoint, and the execution amount and the execution reference amount for the each component and the each test viewpoint are weighted in accordance with an index value that indicates a scale of the component.

According to the aspects of the present disclosure described above, it is possible to provide a software quality determination apparatus, a software quality determination method, and a software quality determination program capable of displaying the results of the bug convergence determination for each component in such a way that these results can be easily compared with one another.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 is a diagram showing one example of components according to the embodiment;

FIG. 4 is a diagram showing one example of test viewpoints according to the embodiment;

FIG. 5 is a diagram showing one example of test viewpoints according to the embodiment;

FIG. 6 is a diagram showing one example of test viewpoints according to the embodiment;

FIG. 11 is a diagram showing one example of test viewpoints that should be executed for each component held in the database according to the embodiment;

FIG. 14 is a graph showing a display example of results of the bug convergence determination for each component and for each test viewpoint according to the embodiment;

FIG. 21 is a diagram showing one example of test viewpoints that should be executed for each component;

DESCRIPTION OF EMBODIMENTS

Hereinafter, with reference to the drawings, embodiments of the present disclosure will be explained. Throughout the drawings in the following description, the same or corresponding elements are denoted by the same reference symbols and overlapping descriptions will be omitted as appropriate for the sake of clarification of the description. Further, specific numerical values and the like stated in the following embodiments are merely examples for facilitating understanding of the present disclosure, and are not limited thereto.

<Configuration of Software Quality Determination Apparatus According to Embodiment>

First, a configuration of a software quality determination apparatus 1 according to this embodiment will be explained.

Figure 1:
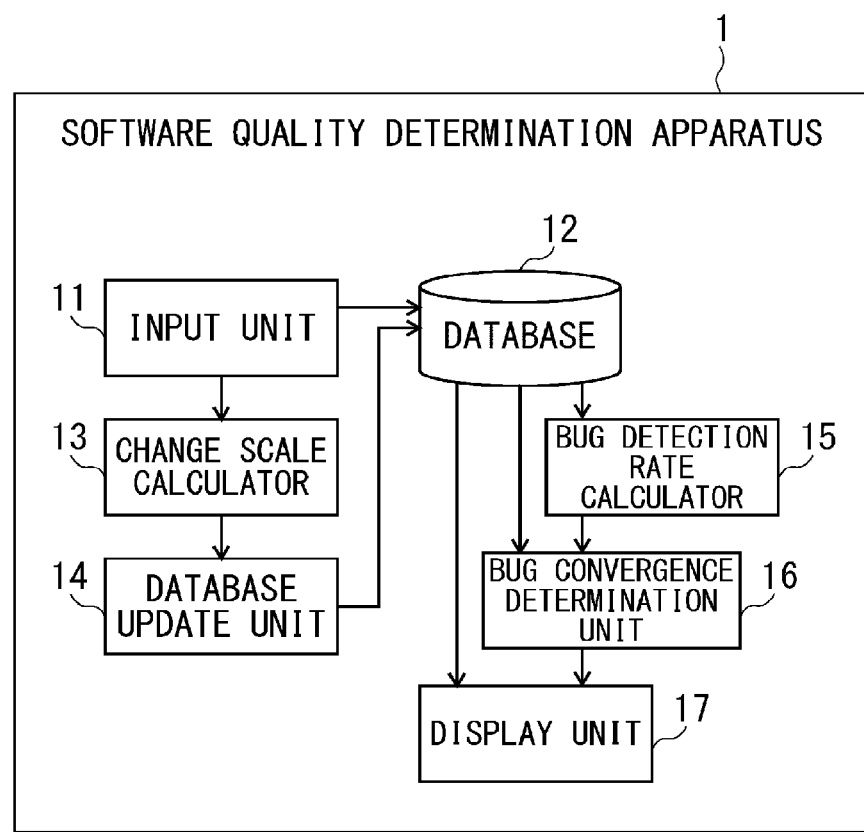
FIG. 1 is a block diagram showing one example of a block configuration of a software quality determination apparatus according to an embodiment.

FIG. 1 is a block diagram showing one example of a block configuration of the software quality determination apparatus 1 according to this embodiment. The software quality determination apparatus 1 according to this embodiment determines convergence of a bug generated in a system (a target to be tested).

As shown in FIG. 1, the software quality determination apparatus 1 according to this embodiment includes an input unit 11, a database 12, a change scale calculator 13, a database update unit 14, a bug detection rate calculator 15, a bug convergence determination unit 16, and a display unit 17.

The input unit 11 is, for example, an input apparatus used by a user to input arbitrary data (the number of bugs that have been detected, a test execution amount and the like described later) into the software quality determination apparatus 1 and set this data in the software quality determination apparatus 1. The input unit 11 is a desired input apparatus such as, for example, a key board, a mouse, a touch screen, or a radio portable terminal (a smartphone, a tablet, etc.)

The database 12 holds data and the like that the user has input into the input unit 11 and set in the input unit 11.

The database 12 holds, for example, for each component that constitutes the system and for each test viewpoint, which is a viewpoint when the system is tested, the number of bugs that have been detected per unit scale of the component (hereinafter it will be referred to as a unit scale) generated in a test of the component and the test viewpoint. The component is a functional element that is held by software or a software item divided by a software architecture. The test viewpoint is, for example, "angles" when performing the test such as test items, standpoints, and idea generation methods in order to check whether a program is normally operated, and is a standpoint of the operation and the procedure when the test is executed. It is known that the bug can be detected by changing these standpoints. The scale is one of the scale of a source code, the index indicating the complexity of the source code, a function point (FP) and the like. In the initial state, the scale is the original scale of the component. After the source code is changed, the scale is a change scale of the component. The change scale is a scale obtained by adding the scale before the change of the component and the scale of the changed part (addition, deletion, or correction) of the component. When, for example, the scale before the change of the component is 100 rows and the scale of the changed part is 30 rows (e.g., 10 added rows, 5 corrected rows, and 15 corrected rows), the change scale of the component is 130 rows. Every time the change scale for each component is calculated by the change scale calculator 13, the number of bugs that have been detected per unit scale for each component and for each test viewpoint held in the database 12 is updated by the database update unit 14.

Further, the database 12 holds, for each component and each test viewpoint, the execution amount of the test per unit scale of the component and the test viewpoint (hereinafter it will be referred to as a test execution amount). The test execution amount is, for example, the number of man-hours of the test executed for the program (hereinafter it will be referred to as the number of test man-hours) or the number of tests. Every time the change scale for each component is calculated by the change scale calculator 13, the test execution amount per unit scale for each component and for each test viewpoint held in the database 12 is updated by the database update unit 14.

Further, the database 12 holds, for each component and each test viewpoint, an execution reference amount, which serves as a reference of the test execution amount per unit scale of the component and the test viewpoint (hereinafter it will be referred to as a test execution reference amount). The test execution reference amount becomes a trigger for the bug convergence determination unit 16 to perform the bug convergence determination. That is, the bug convergence determination unit 16 performs the bug convergence determination for each component and each test viewpoint after the test execution amount per unit scale of the component and the test viewpoint has reached the test execution reference amount per unit scale of the component and the test viewpoint.

As described above, the number of bugs that have been detected, the test execution amount, and the test execution reference amount for each component and for each test viewpoint held in the database 12 are values of the component per unit scale and are weighted (normalized) in accordance with an index value indicating the scale of the component.

Further, the database 12 holds, for each component and test viewpoint, a reference value, which serves as a reference of the detection rate of the bug (hereinafter it will be referred to as a bug detection rate) that has been generated in the test of the component and the test viewpoint. The bug detection rate is a rate obtained by dividing the number of bugs that have been detected per unit scale by the test execution amount per unit scale.

Further, the database 12 holds the change scale for each component. In the initial state, the database 12 does not hold the change scale for each component. When the change scale for each component is calculated by the change scale calculator 13, the database 12 holds the change scale. In the following processing, every time the change scale for each component is calculated by the change scale calculator 13, the change scale for each component held in the database 12 is updated by the database update unit 14.

Further, the database 12 holds, for each component, test viewpoints that have been set in advance as the test viewpoints that the component should execute.

The change scale calculator 13 calculates the change scale for each component when there is a change in the source code in accordance with bug fixing of the system etc.

When the change scale for each component is calculated by the change scale calculator 13, the database update unit 14 calculates, for each component and each test viewpoint, the number of bugs that have been detected and the test execution amount per unit scale of the component and the test viewpoint. The database update unit 14 then updates the number of bugs that have been detected and the test execution amount per unit scale for each component and for each test viewpoint held in the database 12.

The bug detection rate calculator 15 calculates, for each component and each test viewpoint, the bug detection rate of the component and the test viewpoint. Specifically, the bug detection rate calculator 15 divides the number of bugs held in the database 12 that have been detected by the test execution amount held in the database 12, thereby calculating the bug detection rate.

The bug convergence determination unit 16 performs, for each component and each test viewpoint, the convergence determination of the bug generated in the test per unit scale of the component and the test viewpoint after the test execution amount per unit scale of the component and the test viewpoint has reached the test execution reference amount per unit scale of the component and the test viewpoint. Specifically, the bug convergence determination unit 16 performs the following operations for each component and each test viewpoint. That is, the bug convergence determination unit 16 determines whether the test execution amount per unit scale held in the database 12 has reached the test execution reference amount per unit scale held in the database 12. When the test execution amount reaches the test execution reference amount, the bug convergence determination unit 16 performs the bug convergence determination based on the bug detection rate calculated in the bug detection rate calculator 15 and the reference value of the bug detection rate held in the database 12. The bug convergence determination unit 16 determines, for example, that the bug has not converged when the bug detection rate is equal to or larger than a reference value at a predetermined timing after the test execution amount has reached the test execution reference amount. Further, when the bug convergence determination unit 16 has determined that the bug has not converged, the bug convergence determination unit 16 may determine that there is a high risk that a bug will be detected if the difference between the bug detection rate and the reference value is equal to or larger than a threshold.

The display unit 17 is a display apparatus configured to display, for each component and each test viewpoint, the results of the determination made in the bug convergence determination unit 16 regarding the component and the test viewpoint, and to present the results of the determination to the user. The display unit 17 is, for example, a liquid crystal display, an organic Electro Luminescence (EL) display etc.

<Components According to this Embodiment>

Next, specific examples of components according to this embodiment will be explained.

As shown in FIG. 2, the components may be functional elements held by software. In some software, for example, there are the following functional elements, that is, "image processing", "external Interface (IF) control", "internal IF control", "Graphical User Interface (GUI) control", "input/output", "file management", "GUI management", "data conversion", and "others". In the example shown in FIG. 2, the functional elements of the software are components.

Figure 3:
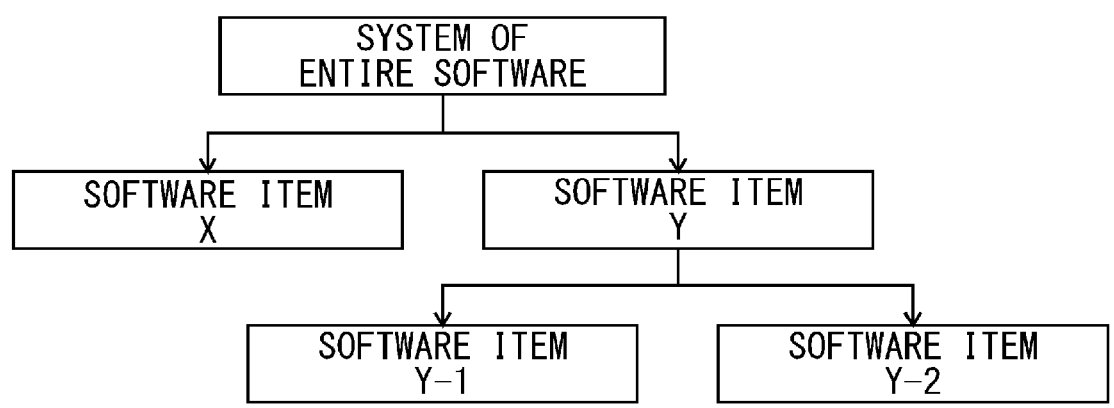
FIG. 3 is a diagram showing one example of components according to the embodiment.

Further, as shown in FIG. 3, the components may be software items divided by a software architecture. In the example shown in FIG. 3, the system of the entire software is divided into a software item X and a software item Y, and the software item Y is further divided into a software item Y-1 and a software item Y-2. In this case, there are three components, that is, the "software item X", the "software item Y-1", and the "software item Y-2".

<Test Viewpoints According to this Embodiment>

Next, specific examples of the test viewpoints and the test execution reference amount according to this embodiment will be explained in detail.

As shown in FIG. 4, the test viewpoints may be quality characteristics of International Organization for Standardization (ISO) 9126. In the example shown in FIG. 4, the test viewpoints are "functionality", "efficiency", "reliability", "usability", "maintainability", and "portability". Further, the test execution reference amount per unit scale for each test viewpoint may be the number of test man-hours/KLOC. In the example shown in FIG. 4, when the test execution reference amount per unit scale of the "functionality" is set to A, the test execution reference amount per unit scale of the "efficiency", that of the "reliability", that of the "usability", that of the "maintainability", and that of the "portability" are respectively 0.1 A, 0.4 A, 0.6 A, 1.1 A, and 0.2 A.

In the example shown in FIG. 5, in the case of the combined test, when the test execution reference amount per unit development scale of the "functionality" is set to A, the test execution reference amount per unit scale of the "efficiency", that of the "reliability", that of the "usability", that of the "maintainability", and that of the "portability" are respectively 0.7 A, 0.5 A, 0.5 A, 0.5 A, and 0.1 A. Further, in the case of the system test, when the test execution reference amount per unit development scale of the "functionality" is set to a, the test execution reference amount per unit scale of the "efficiency", that of the "reliability", that of the "usability", that of the "maintainability", and that of the "portability" are respectively 0.8a, 0.3a, 0.3a, 0.1a, and 0.1a. The system test, which is a test of the whole software, is also referred to as an integration test or a general test. The combined test indicates all the tests in a state in which some components are absent.

Further, statistical data of the number of tests per unit scale disclosed in the following Non-Patent Literature 1 may be used for the test execution reference amount per unit scale for each test viewpoint.

Non-Patent Literature 1: Software Reliability Enhancement Center, Technology Headquarters, Information-technology Promotion Agency, independent administrative agency, "White Papers on Software Development Data 2016-2017", Oct. 1, 2016, page 214

Further, as shown in FIG. 6, the test viewpoint may be a discovery trigger, which serves as a trigger for discovering bugs by an Orthogonal Defect Classification (ODC) analysis (regarding the ODC analysis, see, for example, the following Non-Patent Literature 2). In the example shown in FIG. 6, in the case of a combined test, the test viewpoints are "basics", "combination", "order•repeat", and "interactions". In the case of a system test, the test viewpoints are "load•stress", "recovery-exceptions", "start•re-start", "configuration", and "scenario".

Non-Patent Literature 2: Takashi Yamazaki, Olympus Software Technology Corp., "Defect removal by ODC analysis and visualization of quality maturity", Embedded Technology West 2014 IPA seminar, Jul. 29, 2014, page 30

<Software Quality Determination Method According to this Embodiment>

Next, a software quality determination method by the software quality determination apparatus 1 according to this embodiment will be explained.

First, a method of updating the database 12 according to the software quality determination apparatus 1 according to this embodiment will be explained.

Figure 7:
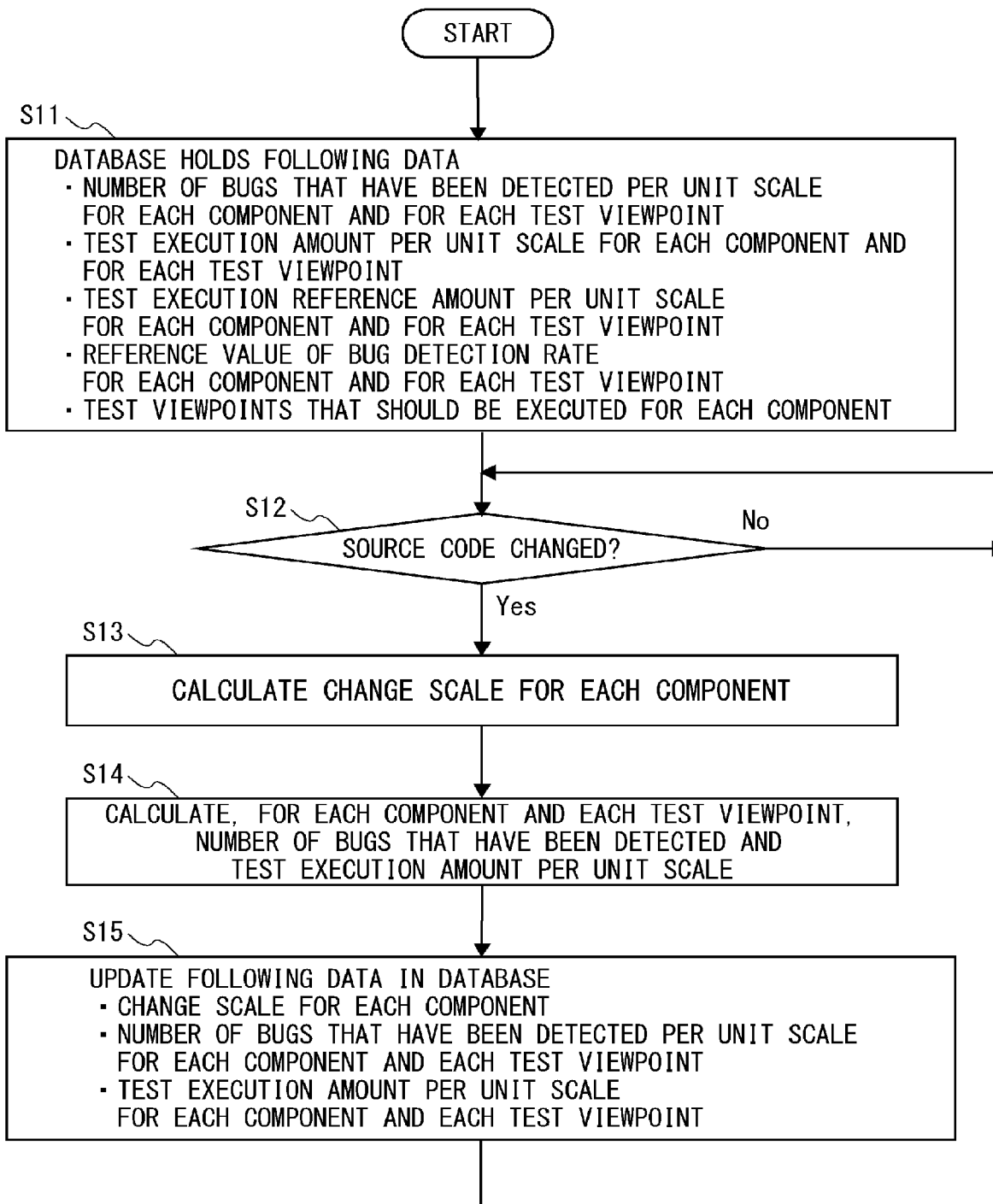
FIG. 7 is a flowchart showing one example of a method of updating a database by the software quality determination apparatus according to the embodiment.

FIG. 7 is a flowchart showing one example of a method of updating the database 12 by the software quality determination apparatus 1 according to this embodiment.

As shown in FIG. 7, the database 12 acquires and holds the following data input by the user into the input unit 11 and set in the input unit 11 (Step S11).

the number of bugs that have been detected per unit scale for each component and for each test viewpoint the test execution amount per unit scale for each component and for each test viewpoint the test execution reference amount per unit scale for each component and for each test viewpoint the reference value of the bug detection rate for each component and for each test viewpoint the test viewpoints that should be executed for each component When the source code is changed in accordance with bug fixing of the system or the like (Yes in Step S12), the change scale calculator 13 calculates the change scale for each component (Step S13). When there is no change in the source code (No in Step S12), the process goes back to Step S12.

When the change scale for each component is calculated in the change scale calculator 13, the database update unit 14 calculates, for each component and each test viewpoint, the number of bugs that have been detected and the test execution amount per unit scale of the component and the test viewpoint (Step S14). Then the database update unit 14 updates the change scale for each component held in the database 12 and also updates the number of bugs that have been detected and the test execution amount per unit scale for each component and for each test viewpoint held in the database 12 (Step S15). In the initial state, the change scale for each component is not held in the database 12. Therefore, the change scale for each component is newly registered in the database 12. After that, the process goes back to Step S12.

In the following processing, the processes of Steps S13-S15 are performed every time the source code is changed.

Next, a method of displaying results of the bug convergence determination according to the software quality determination apparatus 1 according to this embodiment will be explained.

Figure 8:
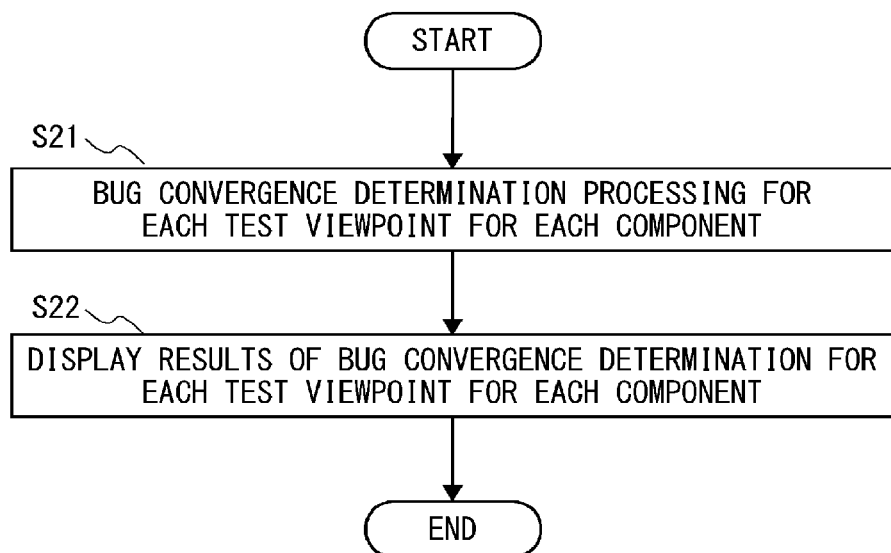
FIG. 8 is a flowchart showing one example of a method of displaying results of bug convergence determination according to the embodiment.

FIG. 8 is a flowchart showing one example of the method of displaying the results of the bug convergence determination according to this embodiment. It is assumed that the processing described below is performed using the latest data held in the database 12.

First, for each component and for each test viewpoint held in the database 12 as a test viewpoint that the component should execute, the bug convergence determination processing to determine the bug convergence is performed by the bug detection rate calculator 15 and the bug convergence determination unit 16 (Step S21).

After that, the display unit 17 displays, for each component and for each test viewpoint held in the database 12 as a test viewpoint that the component should execute, the results of the bug convergence determination made by the bug convergence determination processing in the above Step S21 (Step S22).

Next, the bug convergence determination processing in Step S21 in FIG. 8 will be explained.

Figure 9:
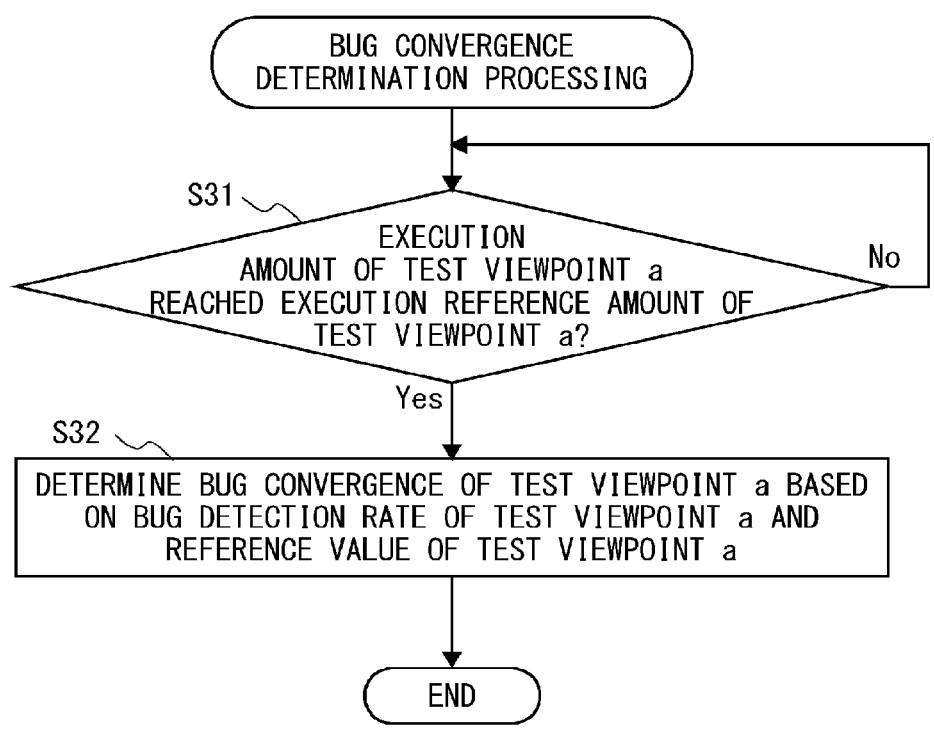
FIG. 9 is a flowchart showing one example of bug convergence determination processing in Step S21 in FIG. 8.

FIG. 9 is a flowchart showing one example of the bug convergence determination processing in Step S21 in FIG. 8. FIG. 9 shows an example of a flow of bug convergence determination processing of a test viewpoint a that a component A should execute.

As shown in FIG. 9, the bug convergence determination unit 16 determines whether the test execution amount per unit scale of the test viewpoint a held in the database 12 has reached the test execution reference amount per unit scale of the test viewpoint a held in the database 12 (Step S31).

When the test execution amount has reached the test execution reference amount (Yes in Step S31), the bug convergence determination unit 16 determines whether the bug has converged in the test viewpoint a based on the bug detection rate of the test viewpoint a calculated in the bug detection rate calculator 15 and the reference value of the bug detection rate of the test viewpoint a held in the database 12 (Step S32).

When, for example, the bug detection rate of the test viewpoint a is equal to or larger than the reference value of the test viewpoint a at a predetermined timing after the test execution amount has reached the test execution reference amount, the bug convergence determination unit 16 determines that the bug has not converged in the test viewpoint a. Further, when it is determined that the bug has not converged in the test viewpoint a, if the difference between the bug detection rate of the test viewpoint a and the reference value of the test viewpoint a is equal to or larger than a threshold, the bug convergence determination unit 16 may determine that there is still a high risk that a bug will be detected in the test viewpoint a.

When the test execution amount has not reached the test execution reference amount (No in Step S31), the process goes back to Step S31.

The aforementioned description is the flow of the bug convergence determination processing of the test viewpoint a. When there are test viewpoints other than the test viewpoint a that should be executed in the component A, the flow of the bug convergence determination processing similar to the processing in FIG. 9 is performed also for the other test viewpoints.

Further, for the components other than the component A, the flow of the bug convergence determination processing similar to the processing in FIG. 9 is performed also for each test viewpoint that each component should execute.

Figure 10:
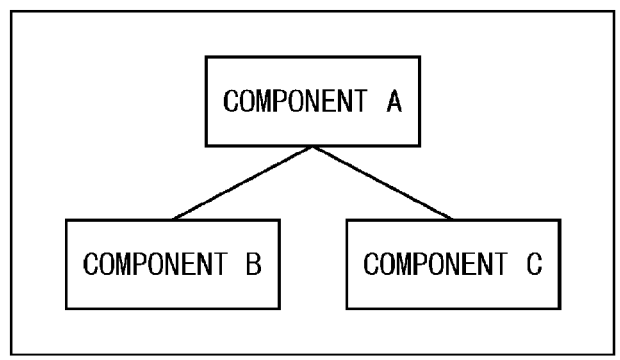
FIG. 10 is a diagram showing one example of components according to the embodiment.

Now, a method of displaying the results of the bug convergence determination according to the software quality determination apparatus 1 according to this embodiment will be explained with some specific examples. It is assumed that, in this example, as shown in FIG. 10, the components are "components A-C". Further, as shown in FIG. 6, the test viewpoints of the combined test are "basics", "combination", "order•repeat", and "interactions" and the test viewpoints of the system test are "load•stress", "recovery•exceptions", "start•re-start", "configuration", and "scenario" based on the discovery trigger of the ODC analysis.

First, examples of the test viewpoints that should be executed for each of the "components A-C" will be explained.

FIG. 11 is a diagram showing one example of the test viewpoints that should be executed for each of the "components A-C" held in the database 12. In FIG. 11, "○" indicates the test viewpoints that should be executed.

As shown in FIG. 11, for example, there are three test viewpoints that the "component A" should execute, that is, "basics", "combination", and "load•stress". Further, there are three test viewpoints that the "component B" should execute, that is, "basics", "order•repeat", and "interactions". Further, there are two viewpoints that the "component C" should execute, that is, "basics" and "interactions".

Next, examples of the test results for each test viewpoint of the "component C" among the "components A-C" will be explained.

Figure 12:
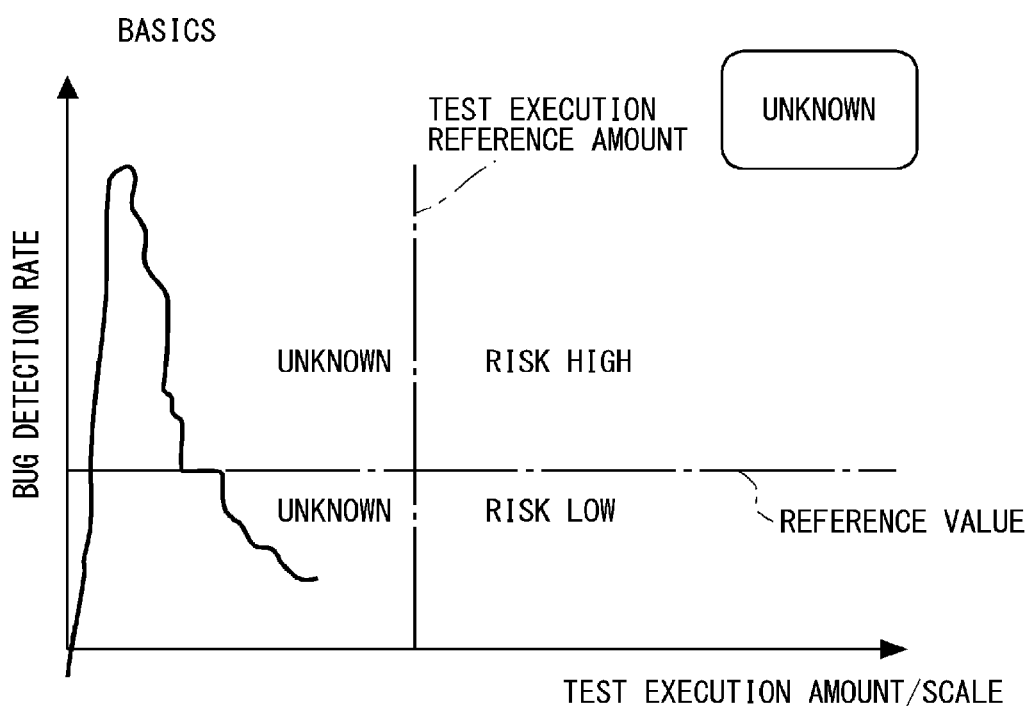
FIG. 12 is a graph showing one example of results of a test of a test viewpoint of a component according to the embodiment.
Figure 13:
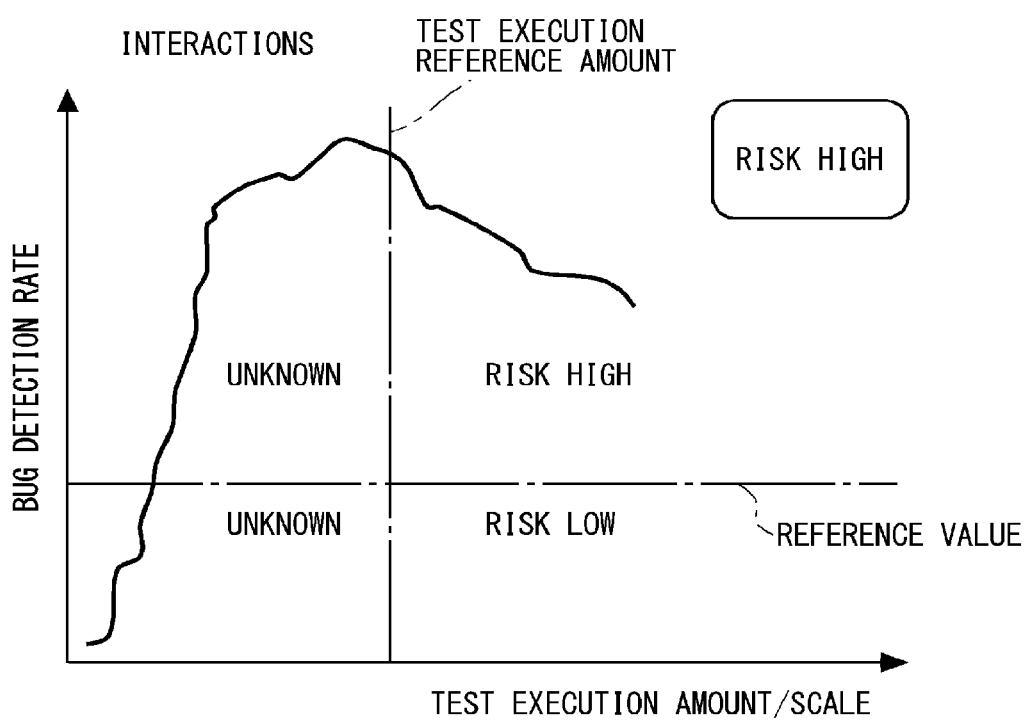
FIG. 13 is a graph showing one example of results of a test of a test viewpoint of a component according to the embodiment.

FIGS. 12 and 13 are graphs each showing one example of the test results for each test viewpoint of the "component C". FIG. 12 shows the result of the test of "basics" and FIG. 13 shows the result of the test of "interactions".

The bug convergence determination unit 16 starts the bug convergence determination for each test viewpoint of the "component C" based on the bug detection rate and the reference value of the test viewpoint after the test execution amount per unit scale of the test viewpoint has reached the test execution reference amount per unit scale of the test viewpoint. At this time, when the bug detection rate is equal to or larger than a reference value, the bug convergence determination unit 16 determines that the bug has not converged. Further, when the bug convergence determination unit 16 has determined that the bug has not converged, if the difference between the bug detection rate and the reference value is equal to or larger than a threshold, the bug convergence determination unit 16 determines that there is still a high risk that a bug will be detected. In this example, when the bug detection rate is equal to or larger than the reference value, the bug convergence determination unit 16 determines that the bug has not converged and the risk is high (that is, the threshold is zero). Otherwise, the bug convergence determination unit 16 determines that the risk is low.

As shown in FIG. 12, regarding the "basics", the test execution amount per unit scale has not reached the test execution reference amount per unit scale. Therefore, the bug convergence determination unit 16 cannot start the bug convergence determination, and therefore determines that the risk level is "unknown".

As shown in FIG. 13, regarding the "interactions", the test execution amount per unit scale has reached the test execution reference amount per unit scale. Therefore, the bug convergence determination unit 16 starts the bug convergence determination. However, the bug detection rate after the test execution amount has reached the test execution reference amount is equal to or larger than the reference value. Therefore, the bug convergence determination unit 16 determines, regarding the "interactions", that the bug has not converged and therefore determines that the risk level is a "high risk".

The bug convergence determination unit 16 performs the bug convergence determination similar to the processing described above also for the "basics", the "combination", and the "load•stress" of the "component A" and the "basics", the "order•repeat", and the "interactions" of the "component B".

Next, a display example of the results of the bug convergence determination for each of the "component A", the "component B", the "component C" and the test viewpoint will be explained.

FIG. 14 is a graph showing a display example of the results of the bug convergence determination for each of the "component A", the "component B", the "component C", and the test viewpoint.

As shown in FIG. 14, the display unit 17 displays the results of the bug convergence determination made by the bug convergence determination unit 16 for each of the "component A", the "component B", and the "component C" and for each test viewpoint that the components should execute shown in FIG. 11.

In FIG. 14, the display unit 17 displays the test viewpoint in which the test execution amount has not reached the test execution reference amount as "unknown", the test viewpoint with a high risk as "high", and the test viewpoint with a low risk as "low". However, the method of displaying the results of the bug convergence determination is not limited thereto.

The display unit 17 may display, for example, for the test viewpoint in which the result of the bug convergence determination shows a "high" risk, the bug detection rate in place of "high" or in addition to "high", or may display the difference between the bug detection rate and the reference amount.

Further, the display unit 17 may display, for the test viewpoint in which the result of the bug convergence determination is "unknown", in place of "unknown" or in addition to "unknown", the number of times of the test of the test execution amount that should be further executed per unit scale by the timing when the test execution amount reaches the test execution reference amount.

Further, the display unit 17 may display, for the test viewpoint in which the result of the bug convergence determination shows a "high" risk, in place of "high" or in addition to "high", the number of times of the test of the test execution amount that should further be executed per unit scale by the timing when the bug detection rate becomes below the reference value. This is because, since the bug detection rate is obtained by dividing the number of bugs that have been detected per unit scale by the test execution amount per unit scale, the bug detection rate decreases when the denominator (test execution amount per unit scale) increases.

<Application of Bug Curve>

The user is able to check whether there is a test viewpoint in which the test has not yet been executed, that is, whether there is a probability that a test viewpoint is not being tested (it is also called a test miss) by applying the software quality determination method according to this embodiment to a conventional bug curve (this curve is also referred to as a reliability growth curve).

Next, a method of checking whether there is a probability of a test not being conducted by applying the software quality determination method according to this embodiment to the conventional bug curve will be explained with some specific examples. In this example, there are six test viewpoints, that is, "basics", "interactions", "operational sequence", "load•stress", "recovery•exceptions", and "GUI" based on the discovery trigger of the ODC analysis.

Figure 15:
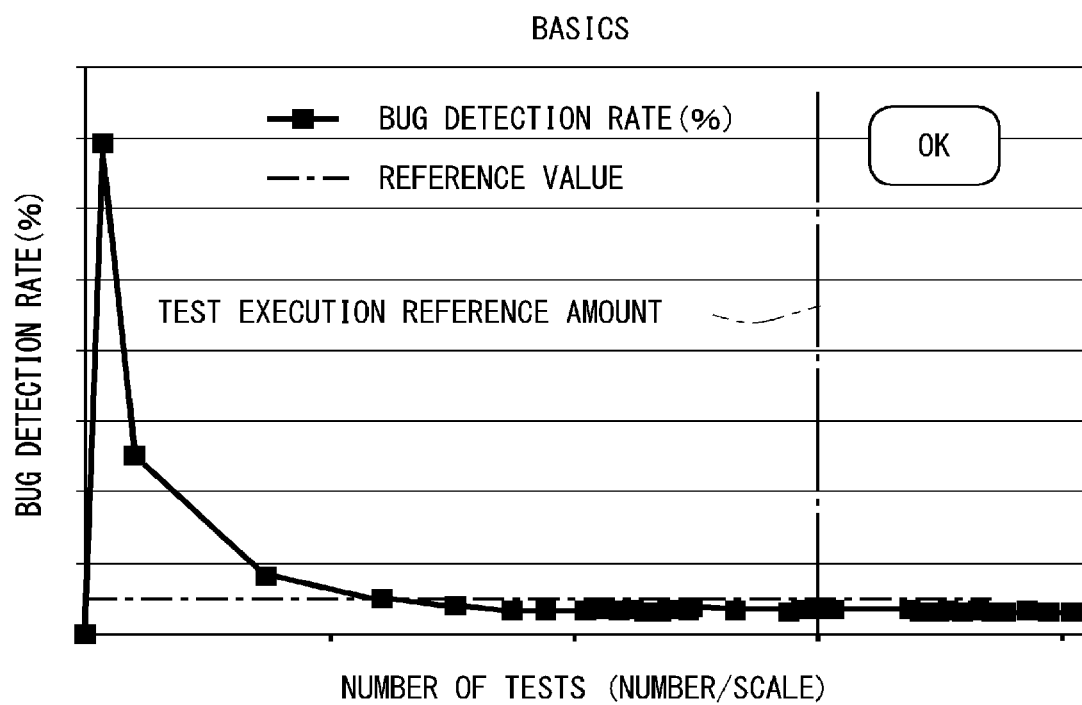
FIG. 15 is a graph showing one example of a bug curve of a test viewpoint of a component.
Figure 16:
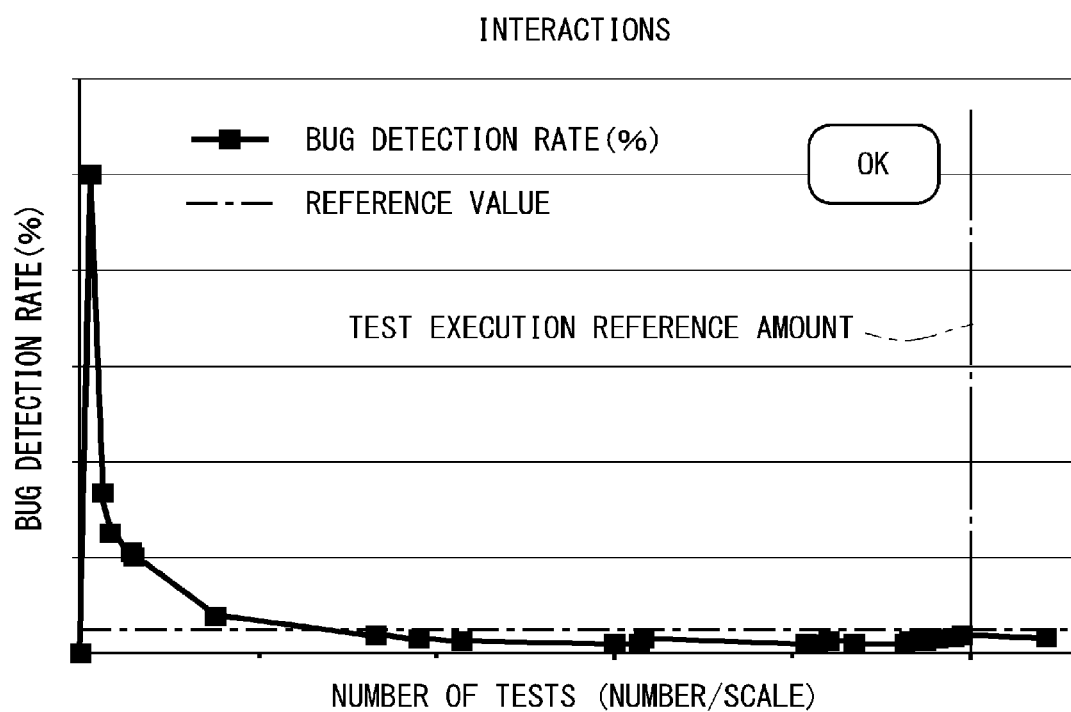
FIG. 16 is a graph showing one example of a bug curve of a test viewpoint of a component.
Figure 17:
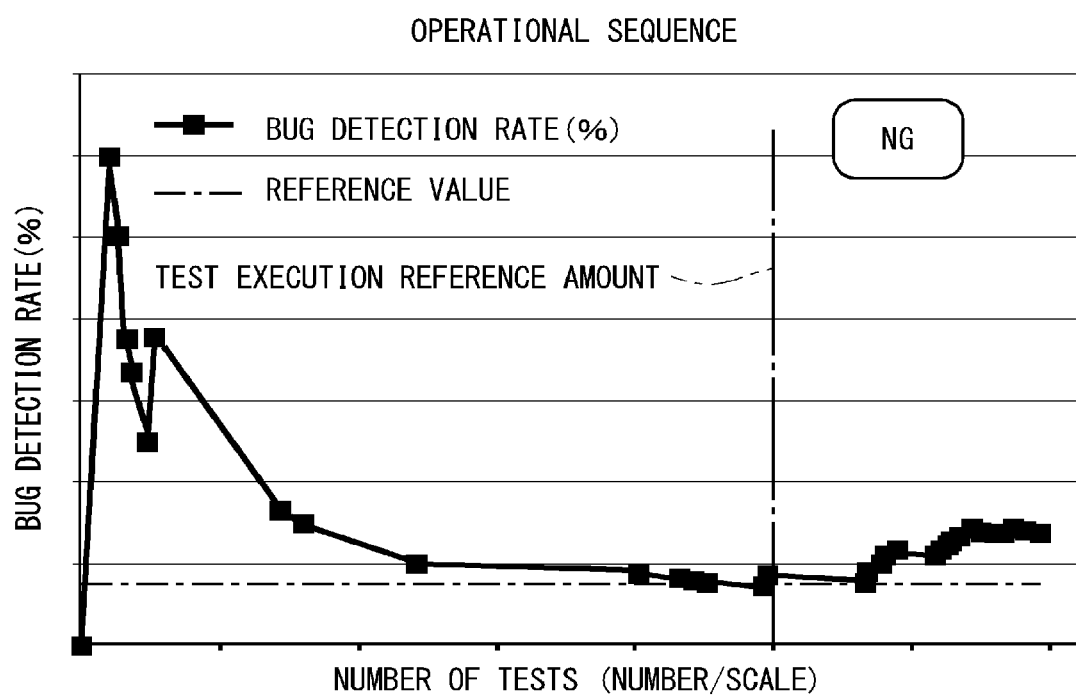
FIG. 17 is a graph showing one example of a bug curve of a test viewpoint of a component.
Figure 18:
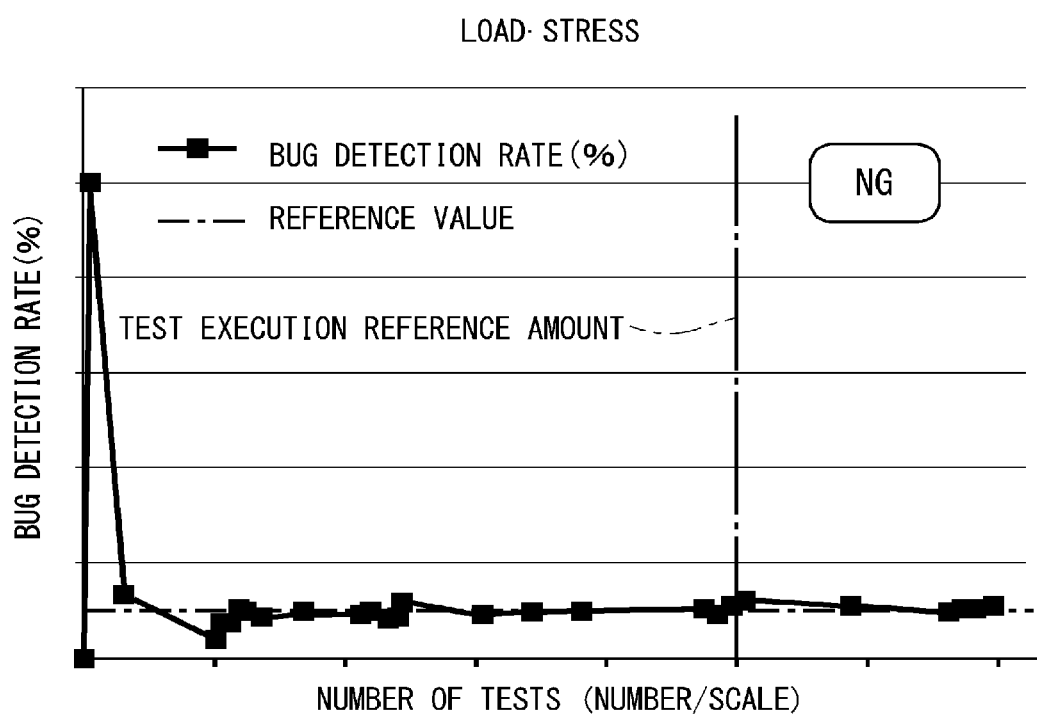
FIG. 18 is a graph showing one example of a bug curve of a test viewpoint of a component.
Figure 19:
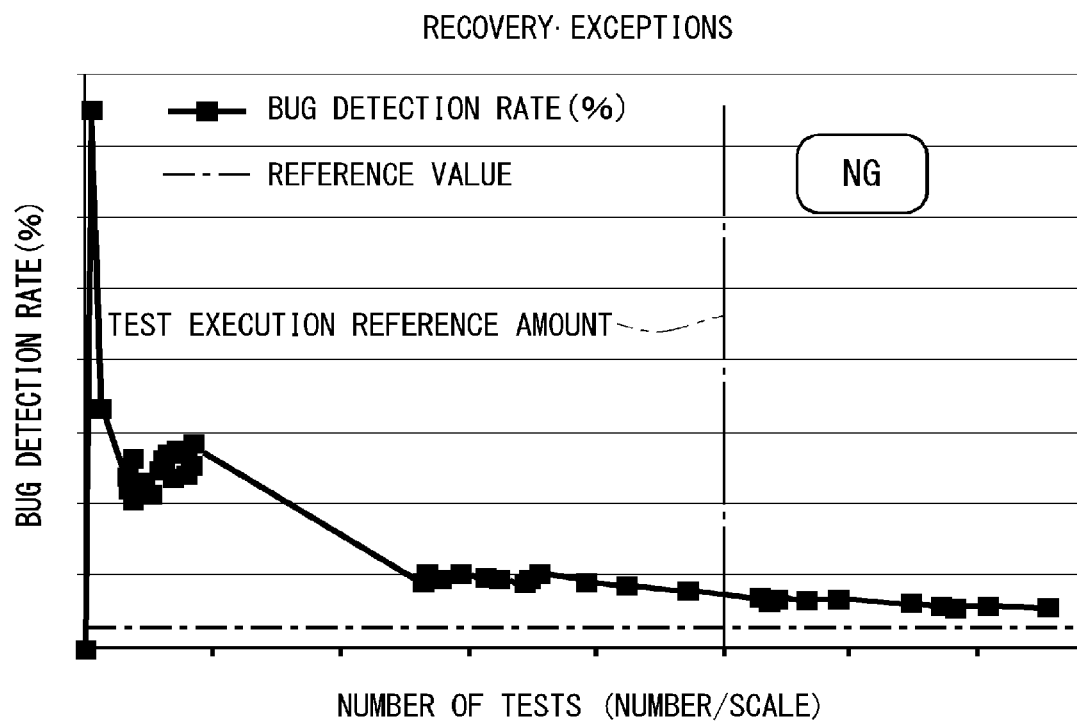
FIG. 19 is a graph showing one example of a bug curve of a test viewpoint of a component.
Figure 20:
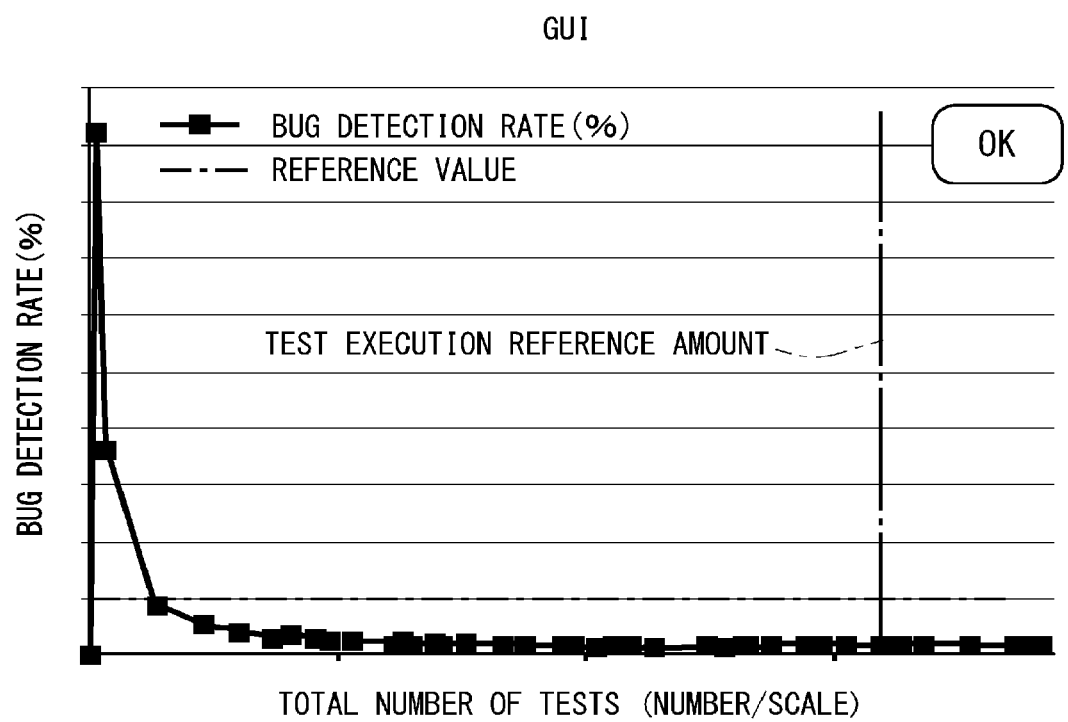
FIG. 20 is a graph showing one example of a bug curve of a test viewpoint of a component.

FIGS. 15-20 are graphs each showing one example of the bug curve for each test viewpoint of one component. FIG. 15 shows the bug curve of the "basics", FIG. 16 shows that of the "interactions", FIG. 17 shows that of the "operational sequence", FIG. 18 shows that of the "load•stress", FIG. 19 shows that of the "recovery•exceptions", and FIG. 20 shows that of the "GUI".

When the test execution amount has not reached the test execution reference amount or when the bug detection rate after the test execution amount has reached the test execution reference amount is equal to or larger than a reference value, the user determines that the bug has not converged and there is still a high probability that a bug will be detected (the quality is NG). On the other hand, when the bug detection rate after the test execution amount has reached the test execution reference amount is below the reference value, the user determines that the bug has converged and a probability that a bug will be detected is low (the quality is OK).

As shown in FIGS. 15-20, regarding the "basics", the "interactions", and the "GUI", the bug detection rate after the test execution amount has reached the test execution reference amount is below a reference value. Therefore, the user determines that the quality is OK. On the other hand, regarding the "operational sequence", the "load•stress", and the "recovery•exceptions", the bug detection rate after the test execution amount has reached the test execution reference amount is equal to or larger than the reference value. Therefore, the user determines that the quality is NG.

Next, the method of checking whether there is a probability of a test not being conducted by applying the software quality determination method according to this embodiment to the conventional bug curve will be explained with other examples. In this example, it is assumed that there are six components, that is, "components P-U". It is further assumed that there are eight test viewpoints, that is, "basics", "combination", "order•repeat", "interactions", "load•stress", "recovery•exceptions", "configuration", and "scenario" based on the discovery trigger of the ODC analysis.

FIG. 21 is a diagram showing one example of the test viewpoints that should be executed for each of the "components P-U". In FIG. 21, "o" indicates the test viewpoints to be executed.

As shown in FIG. 21, for example, there are three components that should execute "load•stress", that is, the "component P", the "component R", and the "component U". Therefore, the user may determine the bug convergence of each of the "component P", the "component R", and the "component U" regarding the "load•stress" and check in which component a problem lies.

Figure 22:
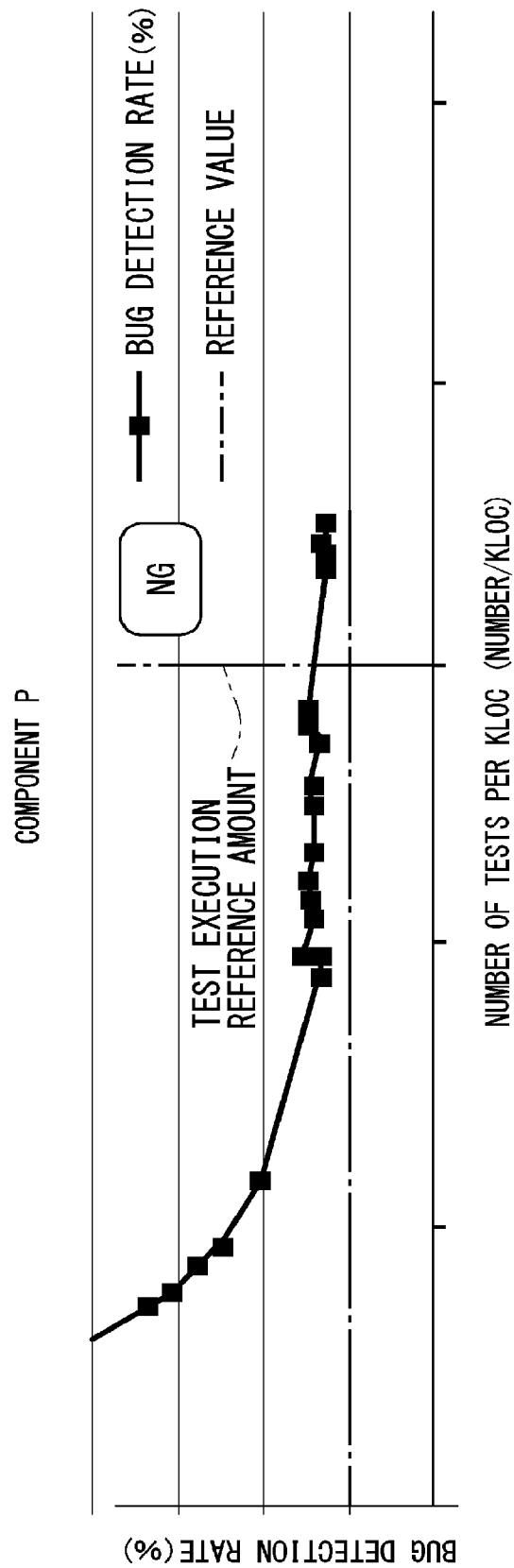
FIG. 22 is a graph showing one example of a bug curve of a test viewpoint of a component.
Figure 23:
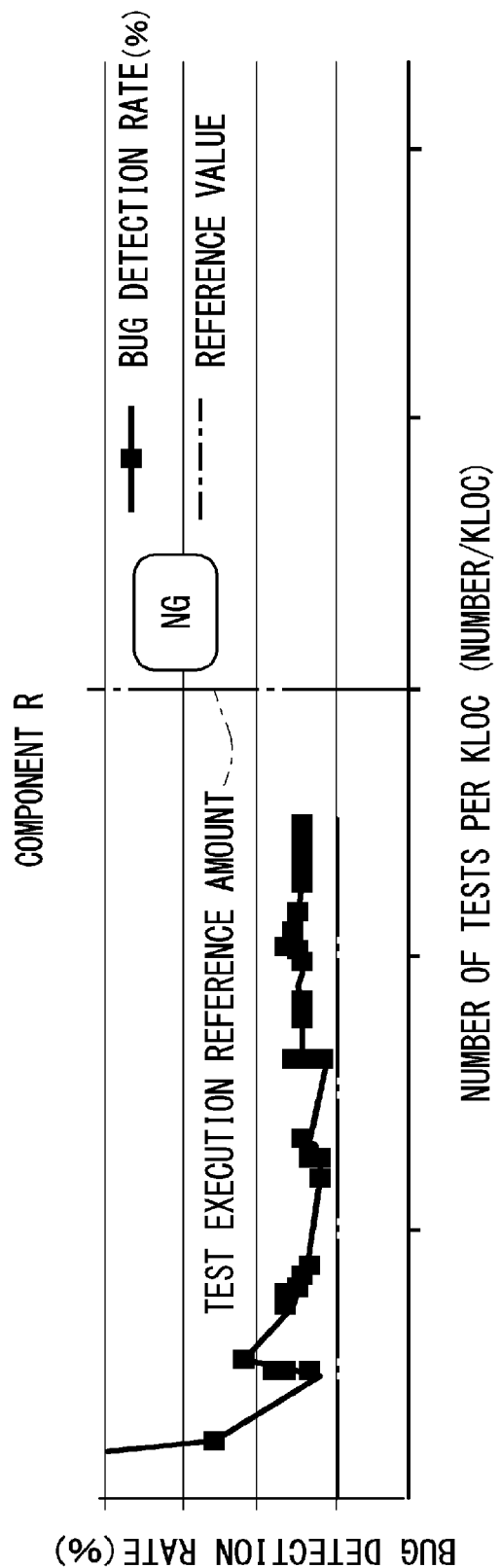
FIG. 23 is a graph showing one example of a bug curve of a test viewpoint of a component.
Figure 24:
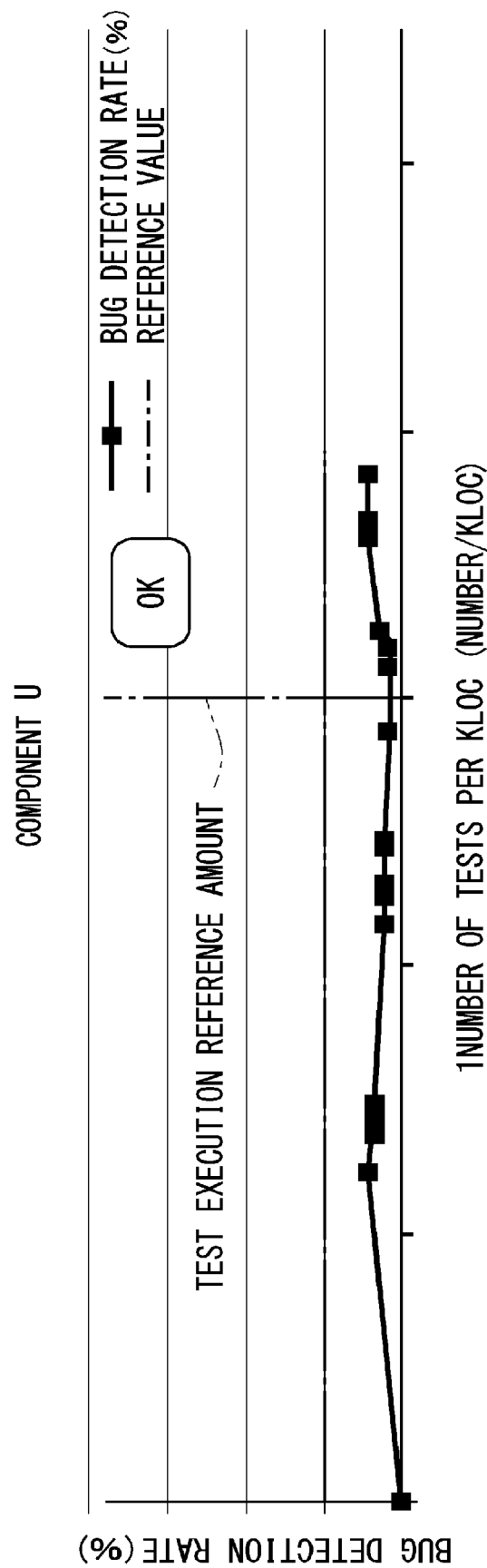
FIG. 24 is a graph showing one example of a bug curve of a test viewpoint of a component.

FIGS. 22-24 respectively show one example of the bug curves of the "load•stress" of the "component P", the "component R", and the "component U". FIG. 22 shows the bug curve of the "load•stress" of the "component P", FIG. 23 shows that of the "component R", and FIG. 24 shows that of the "component U".

As shown in FIGS. 22-24, regarding the "component U", the bug detection rate after the test execution amount has reached the test execution reference amount is below the reference value. Therefore, the user determines that the quality is OK. On the other hand, regarding the "component P", the bug detection rate after the test execution amount has reached the test execution reference amount is equal to or larger than the reference value. Therefore, the user determines that the quality is NG. Further, regarding the "component R", the test execution amount has not reached the test execution reference amount. Therefore, the user determines that the quality is NG.

Accordingly, regarding the "load•stress", the user can tell that the "component P" and the "component R" are problematic.

<Effects of Embodiment>

As described above, according to this embodiment, the test execution amount, the test execution reference amount and the like for each component and for each test viewpoint are values per unit scale of the component and are weighted in accordance with the index value indicating the scale of the component. The bug convergence determination unit 16 determines the bug convergence for each component and each test viewpoint after the test execution amount weighted by the scale of the component has reached the test execution reference amount weighted by the scale of the component, and the display unit 17 displays the result of the determination.

Accordingly, the user who has seen the results of the bug convergence determination displayed on the display unit 17 can easily compare the results of the determinations for components having different scales with each other. Further, since the results of the bug convergence determination are displayed for each component and each test viewpoint, the user is able to prioritize the test viewpoints that should be improved.

Further, according to this embodiment, the scale of the component is one of the scale of the source code, the index indicating the complexity of the source code, and the function point, and is defined as an amount in accordance with the source code. Accordingly, various components and test viewpoints can be weighted with a high degree of freedom.

Further, according to this embodiment, for each component, the test viewpoint that the component should execute is set in advance, and the bug convergence determination unit 16 determines the bug convergence for each component and each test viewpoint that the component should execute. Therefore, it is possible to prevent ineffective tests from being conducted on specific components.

While the present disclosure has been described above with reference to the embodiment, the present disclosure is not limited to the aforementioned embodiment and may be changed as appropriate without departing from the spirit of the present disclosure.

For example, the software quality determination apparatus 1 according to the aforementioned embodiment may be applied to a design and implementation review process. In this case, the test execution amount may be replaced by review man-hours, the scale may be replaced by a volume of the document (the number of rows, the number of pages, the number of characters etc.), and the test viewpoints may be replaced by review viewpoints. A viewpoint table that an organization has or a discovery trigger of the review process of the ODC analysis may be used, for example, for the review viewpoints.

Further, the software quality determination apparatus 1 according to the aforementioned embodiment is achieved by, for example, a computer having a hardware configuration formed of a processor such as a Central Processing Unit (CPU) that performs operation processing or the like, a memory formed of a Read Only Memory (ROM), a Random Access Memory (RAM) or the like that stores a program executed by the processor or various kinds of data, and an interface unit (I/F) that inputs/outputs signals to/from an external device. The processor, the memory, and the interface unit are interconnected with one another via a data bus or the like.

The memory serves as the database 12. Further, the memory stores a program that achieves functions of the change scale calculator 13, the database update unit 14, the bug detection rate calculator 15, the bug convergence determination unit 16, and the display unit 17, and the processor executes these programs, thereby achieving the functions of the change scale calculator 13, the database update unit 14, the bug detection rate calculator 15, the bug convergence determination unit 16, and the display unit 17.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A software quality determination apparatus configured to determine convergence of a bug generated in a system, the apparatus comprising:
   circuitry configured to:
   determine, for each component that constitutes the system and for each test viewpoint, which is a viewpoint of a test operation and procedure when the system is tested, the convergence of the bug generated in a test of the component and the test viewpoint;
   display, for the each component and the each test viewpoint, the result of the determination of the convergence of the bug generated in the test of the component and the test viewpoint; and
   determine, for the each component and the each test viewpoint, the convergence of the bug generated in the test of the component and the test viewpoint based on a bug detection rate of the test viewpoint calculated by dividing a number of bugs that have been detected by a test execution amount and a reference value of the bug detection rate held in a database after the test execution amount of the component and the test viewpoint has reached an execution reference amount held in the database, which serves as a reference of the test execution amount of the component and the test viewpoint, wherein
   the test execution amount and the execution reference amount for the each component and the each test viewpoint held in the database are weighted in accordance with an index value that indicates a scale of the component,
   the test viewpoint that the component should execute is set in advance for the each component, and
   the circuitry is further configured to:
   determine, for the each component and the each test viewpoint that the component should execute, the convergence of the bug generated in the test of the component and the test viewpoint;
   update the database by updating the scale, the test execution amount, and the number of bugs that have been detected based on the result of the determination of the convergence of the bug generated in the test of the component and the test viewpoint; and
   display, for the each component and the each test viewpoint that the component should execute, the result.

2. The software quality determination apparatus according to claim 1, wherein the scale of the component is one of the scale of a source code, an index indicating the complexity of the source code, and a function point.

3. A software quality determination method by a software quality determination apparatus configured to determine convergence of a bug generated in a system, the method comprising:
   determining, for each component that constitutes the system and for each test viewpoint, which is a viewpoint of a test operation and procedure when the system is tested, convergence of a bug generated in a test of the component and the test viewpoint; and
   displaying, for the each component and the each test viewpoint, the result of the determination of the convergence of the bug generated in the test of the component and the test viewpoint, wherein
   in the determination, for the each component and the each test viewpoint, the convergence of the bug generated in the test of the component and the test viewpoint is determined based on a bug detection rate of the test viewpoint calculated by dividing a number of bugs that have been detected by a test execution amount and a reference value of the bug detection rate held in a database after the test execution amount of the component and the test viewpoint has reached an execution reference amount held in the database, which serves as a reference of the test execution amount of the component and the test viewpoint, the test execution amount and the execution reference amount for the each component and the each test viewpoint held in the database are weighted in accordance with an index value that indicates a scale of the component, the test viewpoint that the component should execute is set in advance for the each component, in the determination, for the each component and the each test viewpoint that the component should execute, the convergence of the bug generated in the test of the component and the test viewpoint is determined, the database is updated by updating the scale, the test execution amount, and the number of bugs that have been detected based on the result of the determination of the convergence of the bug generated in the test of the component and the test viewpoint is displayed, and in the displaying, for the each component and the each test viewpoint that the component should execute, the result is displayed.

4. A non-transitory computer readable medium storing a software quality determination program for causing a computer that determines convergence of a bug generated in a system to execute a method comprising:

determining, for each component that constitutes the system and for each test viewpoint, which is a viewpoint of a test operation and procedure when the system is tested, convergence of a bug generated in a test of the component and the test viewpoint; and displaying, for the each component and the each test viewpoint, the result of the determination of the convergence of the bug generated in the test of the component and the test viewpoint, wherein in the determination, for the each component and the each test viewpoint, the convergence of the bug generated in the test of the component and the test viewpoint is determined based on a bug detection rate of the test viewpoint calculated by dividing a number of bugs that have been detected by a test execution amount and a reference value of the bug detection rate held in a database after the test execution amount of the component and the test viewpoint has reached an execution reference amount held in the database, which serves as a reference of the test execution amount of the component and the test viewpoint, the test execution amount and the execution reference amount for the each component and the each test viewpoint held in the database are weighted in accordance with an index value that indicates a scale of the component, the test viewpoint that the component should execute is set in advance for the each component, in the determination, for the each component and the each test viewpoint that the component should execute, the convergence of the bug generated in the test of the component and the test viewpoint is determined, the database is updated by updating the scale, the test execution amount, and the number of bugs that have been detected based on the result of the determination of the convergence of the bug generated in the test of the component and the test viewpoint, and in the displaying, for the each component and the each test viewpoint that the component should execute, the result is displayed.

* * * * *